US010832005B1

(12) United States Patent
Mohajer et al.

(10) Patent No.: US 10,832,005 B1
(45) Date of Patent: Nov. 10, 2020

(54) PARSING TO DETERMINE INTERRUPTIBLE STATE IN AN UTTERANCE BY DETECTING PAUSE DURATION AND COMPLETE SENTENCES

(71) Applicant: SoundHound, Inc., Santa Clara, CA (US)

(72) Inventors: Keyvan Mohajer, Los Gatos, CA (US); Bernard Mont-Reynaud, Sunnyvale, CA (US)

(73) Assignee: SoundHound, Inc., Santa Clara, CA (US)

( * ) Notice: Subject to any disclaimer, the term of this patent is extended or adjusted under 35 U.S.C. 154(b) by 0 days.

(21) Appl. No.: 16/243,920

(22) Filed: Jan. 9, 2019

Related U.S. Application Data

(63) Continuation of application No. 14/550,898, filed on Nov. 21, 2014, now abandoned.

(60) Provisional application No. 61/907,371, filed on Nov. 21, 2013.

(51) Int. Cl.
*G06F 40/205* (2020.01)
*G06F 40/30* (2020.01)

(52) U.S. Cl.
CPC ............ *G06F 40/30* (2020.01); *G06F 40/205* (2020.01)

(58) Field of Classification Search
CPC ..... G10L 15/18; G10L 15/1822; G10L 15/19; G10L 15/222; G10L 25/78; G10L 2025/783; G10L 2025/786; G06F 17/27; G06F 17/274; G06F 17/2785; G06F 40/20; G06F 40/205; G06F 40/211; G06F 40/30

USPC ............... 704/210, 215, 253, 257, 270, 275
See application file for complete search history.

(56) References Cited

U.S. PATENT DOCUMENTS

| 4,449,190 | A | 5/1984 | Flanagan et al. |
| 4,882,757 | A | 11/1989 | Fisher et al. |
| 5,848,388 | A | 12/1998 | Power et al. |
| 6,513,006 | B2 * | 1/2003 | Howard ................. G10L 15/26 704/257 |
| 6,631,346 | B1 | 10/2003 | Karaorman et al. |
| 6,650,652 | B1 | 11/2003 | Valencia |
| 6,662,156 | B2 | 12/2003 | Bartosik |

(Continued)

OTHER PUBLICATIONS

Gibson et al., "Distinguishing Serial and Parallel Parsing", Journal of Psycholinguistic Research, vol. 29, No. 2, 2000, pp. 231 to 240.

(Continued)

*Primary Examiner* — Martin Lerner
(74) *Attorney, Agent, or Firm* — Haynes Beffel & Wolfeld LLP; Andrew L. Dunlap

(57) ABSTRACT

The technology disclosed relates to computer-implemented conversational agents and particularly to detecting a point in the dialog (end of turn, or end of utterance) at which the agent can start responding to the user. The technology disclosed provides a method of incrementally parsing an input utterance with multiple parses operating in parallel. The technology disclosed includes detecting an interjection point in the input utterance when a pause exceeds a high threshold, or detecting an interjection point in the input utterance when a pause exceeds a low threshold and at least one of the parallel parses is determined to be interruptible by matching a complete sentence according to the grammar. The conversational agents start responding to the user at a detected interjection point.

36 Claims, 3 Drawing Sheets

(56) References Cited

U.S. PATENT DOCUMENTS

| | | | |
|---|---|---|---|
| 7,433,819 | B2 | 10/2008 | Adams et al. |
| 7,734,468 | B2 | 6/2010 | Park et al. |
| 8,099,277 | B2 | 1/2012 | Yamamoto et al. |
| 8,165,884 | B2 | 4/2012 | Sanchez |
| 8,694,537 | B2 | 4/2014 | Mohajer |
| 8,762,154 | B1 | 6/2014 | Witt-ehsani |
| 8,843,369 | B1 | 9/2014 | Sharifi |
| 9,437,186 | B1 | 9/2016 | Liu et al. |
| 2003/0078928 | A1 | 4/2003 | Dorosario et al. |
| 2003/0083874 | A1 | 5/2003 | Crane et al. |
| 2003/0225579 | A1 | 12/2003 | Wang et al. |
| 2004/0193420 | A1 | 9/2004 | Kennewick et al. |
| 2005/0137939 | A1 | 6/2005 | Calabria et al. |
| 2005/0144064 | A1 | 6/2005 | Calabria et al. |
| 2005/0144065 | A1 | 6/2005 | Calabria et al. |
| 2006/0080099 | A1 | 4/2006 | Thomas et al. |
| 2006/0100863 | A1 | 5/2006 | Bretier et al. |
| 2006/0241948 | A1 | 10/2006 | Abrash et al. |
| 2006/0293886 | A1 | 12/2006 | Odell et al. |
| 2007/0288444 | A1 | 12/2007 | Nelken et al. |
| 2008/0133508 | A1* | 6/2008 | Jiang ............... G06F 16/3347 |
| 2008/0154594 | A1 | 6/2008 | Itoh et al. |
| 2009/0064029 | A1 | 3/2009 | Corkran et al. |
| 2010/0124892 | A1 | 5/2010 | Issa et al. |
| 2012/0046936 | A1 | 2/2012 | Kandekar et al. |
| 2012/0053945 | A1 | 3/2012 | Gupta et al. |
| 2013/0018656 | A1 | 1/2013 | White et al. |
| 2015/0220507 | A1* | 8/2015 | Mohajer ............... G10L 15/18 704/9 |
| 2016/0171981 | A1* | 6/2016 | Mohajer ............... G10L 15/02 704/235 |
| 2017/0337370 | A1* | 11/2017 | Chereshnev ........ G06F 21/6218 |

OTHER PUBLICATIONS

Johnson, Mark, "Parsing in Parallel on Multiple Cores and GPUs", Proceedings of Australasian Language Technology Association Workshop, 2011, pp. 29 to 37.

Atterer, et al., "Towards Incremental End-of-Utterance Detection in Dialogue Systems," pp. 11-14, Aug. 2008.

Hariharan, et al., "Robust End-Of-Utterance Detection for Real-Time Speech Recognition Applications," IEEE International Conference on Acoustics, Speech, and Signal Processing, May 7-11, 2001.

Ferrer, "A Prosody-Based Approach to End-Of-Utterance Detection That Does Not Require Speech Recognition," IEEE International Conference on Acoustics, Speech, and Signal Processing, Apr. 6-10, 2003.

Raux, "Optimizing End-of-Turn Detection for Spoken Dialog Systems, Workshop on Modeling Human Communication Dynamics at NIPS," pp. 14-17, Dec. 10, 2010.

Gorman, "Automatic detection of turn-taking cues in spontaneous speech based on prosodic factors," 81st Annual Meeting of the Linguistic Society of America 2007, 12 pages.

Raux, "A Finite-State Turn-Taking Model for Spoken Dialog Systems," Human Language Technologies: The 2009 Annual Conference of the North American Chapter of the ACL, pp. 629-637, Boulder, Colorado, Association for Computational Linguistics, Jun. 2009.

Branting, "Dialogue Management for Conversational Case-Based Reasoning, Advances in Case-Based Reasoning," ECCBR 2004, Lecture Notes in Computer Science, vol. 3155, Springer, Berlin, Heidelberg, 2004, 15 pages.

Cassell, "More Than Just Another Pretty Face: Embodied Conversational Interface Agents," Communications of the ACM, 2000, vol. 43, pp. 70-78, 2000.

McGlashan, et al., "Section 6.3.2 Generic Speech Recognizer Properties," Voice Extensible Markup Language (VoiceXML) Version 2.0, W3C, Mar. 16, 2004, 150 pages.

Raux, et al., "Optimizing the Turn-Taking Behavior of Task-Oriented Spoken Dialog Systems," ACM Transactions on Speech and Language Processing, vol. 9, No. 1, Article 1, Apr. 17, 2012, 23 pages.

Raux, "Flexible Turn-Taking for Spoken Dialog Systems", Carnegie Mellon University thesis, Dec. 2008.

Raux, et al., "Optimizing Endpointing Thresholds using Dialogue Features in a Spoken Dialogue System", Proceedings of the 9th SIGdial Workshop on Discourse and Dialogue, Association for Computational Linguistics, Columbus, pp. 1-10, Jun. 2008.

Ramírez, J.;et al "Voice Activity Detection. Fundamentals and Speech Recognition System Robustness". In M. Grimm and K. Kroschel, editors, Robust Speech Recognition and Understanding. Jun. 2007, pp. 1-22.

Fuentes, O.,et al, "A filter-based approach to detect end-of-utterances from prosody in dialog systems." Proceedings of NAACL HLT 2007, Companion Volume, pp. 45-48, Rochester, NY, Apr. 2007.

Baumann, T. "Integrating Prosodic Modeling with Incremental Speech Recognition." Proceedings of DiaHolmia (Semdial 2009).

Ferrer, L., Shriberg, E., and Stolcke, A. "A prosody-based approach to end-of-utterance detection that does not require speech recognition." Proceedings of the IEEE Conference on Acoustics, Speech, and Signal Processing (ICASSP 2003).

* cited by examiner

```
public block (DateTimeRange range)         ⎯ 111
DATE_TIME_RANGE() {
                                    ⎯ 121
interpret {
    ("between" . (n_start =
DATE_AND_TIME()) . "and" . (n_end =
DATE_AND_TIME())) as { … }          ⎯ 131
}
```
FIG. 1
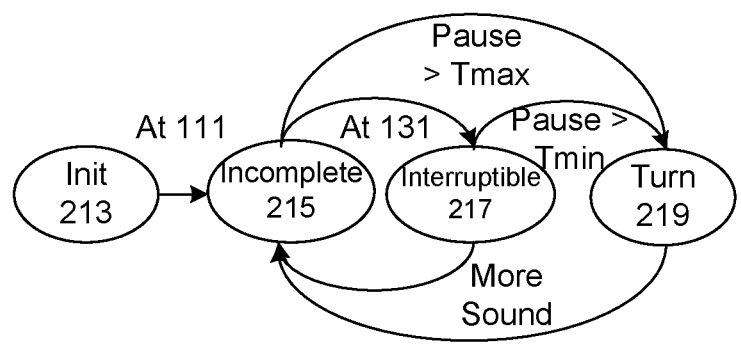
FIG. 2
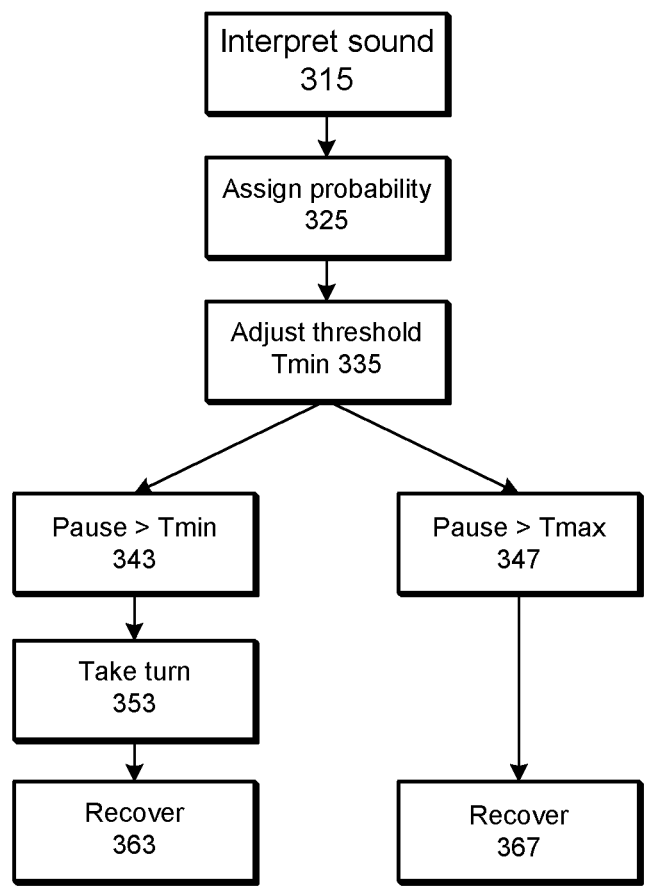
FIG. 3

PARSING TO DETERMINE INTERRUPTIBLE STATE IN AN UTTERANCE BY DETECTING PAUSE DURATION AND COMPLETE SENTENCES

RELATED APPLICATIONS

This application is a continuation of U.S. patent application Ser. No. 14/550,898, now abandoned, filed on Nov. 21, 2014, entitled "PARSING TO DETERMINE INTERRUPTIBLE STATE IN AN UTTERANCE BY DETECTING PAUSE DURATION AND COMPLETE SENTENCES," which claims the benefit of U.S. Provisional Application No. 61/907,371 filed on Nov. 21, 2013, entitled "RAPID TURN TAKING USING INCREMENTAL SYNTACTIC AND SEMANTIC ANALYSIS". The provisional application is hereby incorporated by reference.

This application is further related to U.S. Provisional Application No. 61/798,526 filed on Mar. 15, 2013, entitled "AN INTEGRATED PROGRAMMING FRAMEWORK FOR SPEECH AND TEXT UNDERSTANDING" (MELD 1017-2) and U.S. application Ser. No. 13/480,400 filed on May 24, 2012 and issued as U.S. Pat. No. 8,694,537 on 8 Apr. 2014, entitled "SYSTEM AND METHODS FOR ENABLING NATURAL LANGUAGE PROCESSING", both of which are hereby incorporated by reference.

BACKGROUND

The technology disclosed relates to computer-implemented conversational agents and particularly to detecting a point in the dialog (end of turn or end of utterance) at which the agent can start responding to the user.

RELATED ART

The use of natural language interfaces and virtual agents to handle a dialog between humans and computers is growing, especially on mobile devices. Conversational agents are challenged by the turn-taking that occurs naturally in human conversation. The cues that people use to indicate a readiness to switch turns include silence gaps and prosody features (pitch and loudness contours, and body language such as visual contact), in combination with syntactic and semantic properties of the utterance, to convey the end of a turn quickly and effectively.

One approach used by conversational agents is to measure the length of silence gaps (pauses) and compare them to a fixed threshold. For example, a half second pause will trigger the completion of a turn. The distinction between silence and speech in the audio is made by a Voice Activity Detector (VAD). A pause duration following speech activity (sound) is compared with a threshold. Various types of VADs have been described in the literature. Ramirez et al. provide a survey of VAD techniques in Ramirez, J.; J. M. Górriz, J. C. Segura (2007). "Voice Activity Detection. Fundamentals and Speech Recognition System Robustness". In M. Grimm and K. Kroschel. *Robust Speech Recognition and Understanding.* pp. 1-22. ISBN 978-3-902613-08-0. Wikipedia also has an article on voice activity detection. In general, VAD helps detect the length of a pause, and a turn completion decision is based on comparing this length to a threshold.

Other approaches, such as [Fuentes et al., 2007] emphasize the role of prosody in turn-taking. Fuentes, O., Vera, D. and Solorio, T, "A filter-based approach to detect end-of-utterances from prosody in dialog systems." In *Proc. Human Language Technologies* 2007. Prosody refers to resources of pitch, stress, loudness and tempo to convey meaning and signal a speaker's intentions in discourse. Baumann [2009] discusses prosody in the context of speech recognition; Ferrer at al. [2003] point out that prosody helps predict turn-taking without speech recognition. Baumann, T. "Integrating Prosodic Modeling with Incremental Speech Recognition." In *Proceedings of DiaHolmia* (Semdial 2009); Ferrer, L., Shriberg, E., and Stolcke, A. "A prosody-based approach to end-of-utterance detection that does not require speech recognition." In *Proceedings of the IEEE Conference on Acoustics, Speech, and Signal Processing* (ICASSP 2003).

An opportunity arises to introduce a well-balanced method of low latency turn taking while delaying the response up to the point where an informed turn-taking decision can be made.

SUMMARY

The technology disclosed relies on an incremental parser. Several such parsers exist. One implementation presents a method that includes incrementally parsing an input utterance against a grammar that specifies valid sentences by processing input tokens derived from the input utterance. The tokens are scanned in time order, and multiple parses are created and maintained in parallel.

A parse is called complete when it matches a complete sentence according to the grammar. In this method, the incremental parsing of input tokens is called interruptible when any one of the parallel parses is complete. When parsing is interruptible, the parsing and the parser are also referred to as being in an interruptible state. Conversely, if none of the active parses is complete, parsing is called incomplete, and the parsing and the parser are referred to as being in an incomplete state. The method further includes detecting a first interjection point when the duration of a pause in the utterance is greater than a long-time latency threshold, abbreviated Tmax, or when the duration of a pause in the utterance is greater than a short time latency, abbreviated Tmin, while the parsing is interruptible. An automated conversational agent may respond to the user at the first interjection point.

Other aspects and advantages of the technology disclosed can be seen on review of the drawings, the detailed description and the claims, which follow.

BRIEF DESCRIPTION OF THE DRAWINGS

FIG. 1 is a Terrier code example of a DATE_TIME_RANGE( ) block.

FIG. 2 is a simple state transition diagram that shows parser states (initial state, incomplete state, interruptible state, turn-taking state) and their transitions.

FIG. 3 is a simplified flow chart that includes adjusting the threshold Tmin responsive to the likelihood that the interruptible parse represents an actual intent of the utterance.

DETAILED DESCRIPTION

Figure 4:
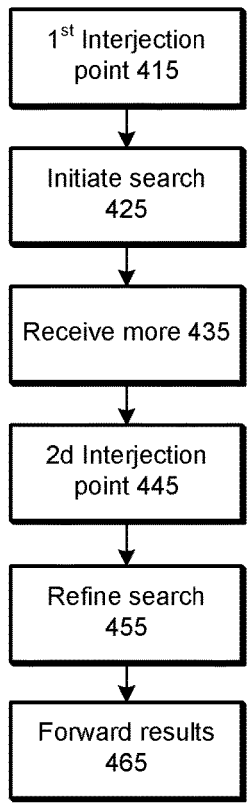
FIGS. 4-5 are simplified flows of processing successive qualification and the like with first and second interjection points.

A detailed description of implementations of the technology disclosed is provided with reference to FIGS. 1-7. Computer-implemented conversational agents can be improved using the technology disclosed. Methods are described that run on electronic devices, such as computers. The electronic devices include memory for storage of data and software applications, a processor for accessing data and executing applications, and components that facilitate communication over a communication network. The electronic devices may be for example a desktop computer, a laptop, a tablet computer, a mobile phone, or any other type of computing device. The method running on the devices can be implemented in hardware, firmware, or software running on hardware.

Other implementations may include a non-transitory computer readable storage medium storing instructions executable by a processor to perform a method as described above. Software that is combined with hardware to implement the technology disclosed can be stored on computer readable media such as a rotating or non-rotating memory. The non-rotating memory can be volatile or non-volatile. In this application, computer readable media does not include a transitory electromagnetic signal that is not stored in a memory: computer readable media stores program instructions for execution. Yet another implementation may include a system including memory and one or more processors operable to execute instructions, stored in the memory.

Natural turn-taking during conversations between people takes advantage of many factors including pauses, prosody, body language, sentence structure and semantics.

A computer-implemented conversational agent can benefit from a rapid yet reliable method of detecting the end of a turn. The technology disclosed can take advantage of real time natural language understanding of spoken utterances using an incremental parser to determine how long a pause should be to be interpreted as the end of a turn. In one implementation, the incremental parser performs parallel parses to extract meaning that is described using a system known as Terrier ("Integrated Programming Framework for Speech and Text Understanding," U.S. Patent Application No. 61/798,526, filed on Mar. 15, 2013), which is incorporated by reference above. The Terrier system parses and interprets speech utterances in a subset of natural language. Other natural language understanding systems that use an incremental parser/interpreter to detect syntactic and semantic completion also can take advantage of rapid turn taking, using the technology disclosed.

We briefly review the operation of incremental parsers, drawing on formal language theory. We assume a context-free grammar with one or more start symbols; these are the nonterminal symbols from which acceptable strings may be generated. An incremental parser processes input tokens that are transcriptions of spoken words one at a time; the state of the parser is updated after each token is read. An incremental parser maintains in parallel the possible parses up to the last token read; these are called the active parses. When a token is read, some of the active parses die out because they can no longer be continued with the new token, while the parses that remain active get split into multiple parses when the grammar allows several ways to continue while accepting the new token. In addition, one or more of the new parses may be complete, meaning that the input sequence up to that point forms a complete sentence according to the grammar.

Many natural language understanding systems that can benefit from application of the technology disclosed define a likelihood score for each parse, and propagate such scores as new input tokens are parsed. The specific way in which this is done for Terrier is described in the referenced application (U.S. Provisional Application No. 61/798,526). Some other natural language understanding systems also make use of likelihood scores.

Applying the technology disclosed, the state of parsing will transition to the interruptible state when at least one of the active parses is complete. In a given dialog situation, the agent is ready to accept certain kinds of responses from the user; for example, a date is expected, or a time, or both. This might be represented as a DATE_AND_TIME( )non-terminal, which will be a start symbol of a complete sentence. A complete sentence can be derived from one of the start symbols applying a production rule. But the agent might also accept a well-formed action request which is not a date or time. This would contribute one or more additional start symbols. Each start symbol is a grammar non-terminal whose meaning matches the agent's expected semantic categories.

As input tokens appear one at a time, the parser state switches among states including an interruptible state described above, a failure state that is reached when there is no active parse that continues with the last token read, and an incomplete state that has at least one active parse but no complete parse. In the provisional application that is incorporated by reference, we called this incomplete state "continuable." The new name for the state should not introduce new matter. The grammar specifies complete (valid) sentences and their interpretation. In our exemplary embodiment, Terrier blocks define one such grammar. The grammar is used by an incremental parser to progressively parse the user's utterance. The technology disclosed includes detecting in at least one of the parses coincidence of the interruptible state and a pause longer than Tmin. When in the interruptible state, detecting a pause longer than Tmin triggers an interjection point at which the conversational agent can take its turn and respond to the human utterance.

In implementations of the technology disclosed, parallel processes can handle detection of audio features, assembly of audio features into phoneme lattices, left-to-right construction of word lattices, and parsing and interpretation of hypothesized word sequences. In particular, completion of syntactic and semantic targets can be performed incrementally.

Consider the example of a conversational agent for a flight reservation system, which asks a prospective traveler:

Agent: "When do you want to leave?"

The conversational agent expects to receive an answer that amounts to a "Date." The surface expression of a Date entity can vary greatly in form, so the parser recognizes alternative expressions. The Date plays a specific semantic role. In this example, the semantic role is that of a valid departure date. It is also useful for the parser in this example to cover date ranges and optional times. A meaning (a.k.a. deep structure) is extracted from the utterance (a.k.a. surface structure) by way of parsing (the syntactic aspect of the analysis process) and interpretation (the semantic aspect of the process.) In the current example, the meaning takes the form of a Date entity.

Answers such as: "Monday"; "The $28^{th}$ in the evening"; "The $28^{th}$ or $29^{th}$"; "Early on September 28"; and "During the week of September 30" qualify as valid answers that complete the conversational agent's expectation of a valid Date entity.

An incomplete answer such as "Monday the" does not achieve completeness, since the expression needs additional words to become a complete "sentence" according to the "Date" grammar.

Syntactic completion can result in semantic completion, although the agent may have to request a clarification. The answer "Monday the 29$^{th}$" given early in September 2013 could elicit from the agent a request for clarification, since the 29$^{th}$ is a Sunday. The speaker may have meant "Monday the 30$^{th}$" or "Sunday the 29$^{th}$"—most likely the former, because people make more frequent errors about dates of the month than about days of the week. Unsatisfactory as it may be, the utterance "Monday the 29$^{th}$" achieves what we call completion, in the sense that the interaction is ready for turn-taking.

Interrupted sequences also can be handled by keeping track of incomplete conversations. For instance, the question "When do you want to leave?" about the user's desired departure time, could elicit a user's change of topic to "At what time is the departure?" followed by an answer to the earlier question, such as, "I want to leave on the 28$^{th}$." This illustrates the range of responses that a conversational agent could be designed to handle, and the fact that multiple entities could be expected, corresponding to different start symbols in the grammar.

Suppose that the agent expects to receive an answer that amounts to a Date—a known semantic unit for which alternative surface expressions can be recognized. In an exemplary embodiment using the Terrier framework, a Date is recognized when the utterance (or the utterance prefix, to be more precise) matches a DATE( ) block. In the Terrier language, a DATE( ) block represents the specific semantic category—Date—and its syntactically valid expressions. In the example, the DATE( ) block could be called from a DEPARTURE_SPEC( ) block, which includes additional context as well as the date. In this context, the agent may also process other types of responses, but with a much reduced likelihood of being matched.

Consider the following possible responses from a user, where short pauses are indicated explicitly when they exceed the low pause threshold Tmin:
1) Tomorrow evening (short pause)
2) Leaving September 12 (short pause)
3) I want to fly on September 12 (short pause) in the evening (short or long pause)
4) Between the 12th and (long pause) the 15th (short pause)

In cases 1 and 2, a short pause will be sufficient to trigger a response from the agent, which is likely to be asking another question. At some point, the response may also be to list or display flight options. The short pause is sufficient because the user's answer has successfully matched the syntactic and semantic expectations of the agent for a DATE( ).

Case 3 shows instability that is benign. Here, the agent may give a low-latency response (starting to ask the next question right after the first pause) but upon hearing that the user is still speaking, the agent has options for processing the user's further speech. In case of an overlap or confusion, the agent may elicit confirmation from the user such as:

Agent: "OK, you want to leave September 12 in the evening. Is that correct?"

This conversational prompt may be sufficient to restore a sense of full communication. If at that point the response was a list of flights, a new answer can be displayed that restricts the flights to evening flights. In either case, the consequences of instability are mild; this is because the user understands the logic of further specifying a date.

Case 4 illustrates a different interesting situation. Here, the lack of completion of syntactic and semantic constraints prevents a long pause from triggering the agent's response. The user's turn is not considered finished until the syntactic/semantic 'between' construct is complete. After a yet longer pause, the system will eventually register a failure of the parser and enter a "recovery mode" where it asks a follow-up question, such as:

Agent: "Between the 12th and when? Please specify a departure date again."

When receiving a user's speech, an agent will work with the speech input received so far, and go into response generation mode, when (1) a syntactically and semantically valid request was received (2) followed by a short pause, that is, a pause that exceeds a low threshold, Tmin. In some implementations, the value of Tmin may be set to 0.1 or 0.2 or 0.25 or 0.5 seconds, or in a range between any two of these values.

The case where a user's speech has a valid syntax but invalid semantics is somewhat rare, but can be accounted for. If, in response to "When do you want to leave?" the user replies "I want to leave yesterday" the system could, instead of treating that as an invalid semantics, treat it with a non-standard answer such as laughter, or ask humorously "Are you sure about that?" This would be a reasonable effort to insure that syntactically correct entries result in acceptable semantics.

A user's (partial) utterance is incomplete if it is not a complete sentence, but could be extended to a complete sentence according to the grammar. In other words, an incomplete utterance is a prefix of a complete sentence, that is not itself a complete sentence. The incremental parser can tell if an utterance is incomplete. While a user's ongoing utterance is incomplete, a conversational agent will normally wait for the user to complete a grammatical sentence. When a pause exceeds a high threshold, Tmax, the agent's response creation or recovery process may be triggered. For instance, Tmax may be set to 1 second, 2 seconds or even longer than 1 or 2 seconds. The threshold Tmax may be three, four, five or ten times longer than the threshold Tmin in various circumstances, or in a range between any two of those factors.

The process of creating a response may be straightforward if there is only one valid type of continuation; the agent could turn the expected category into a question, while retaining the previous context. Example:

User: "I am going to send the message to (long pause)"
Agent: "To whom?" or "Who are you going to send the message to?"

If there are multiple continuations, the system can enumerate a reasonable number of alternatives, such as two or three, and wait for a response.

Then, there is the case in which the input is erroneous. An incorrect utterance can be "fixed". Terrier blocks allow syntax to be defined in as flexible a way as possible, using low weights to convey the least likely expressions, while allowing them as a backdrop. This allows Terrier expressions to include fallback blocks—alternative expressions that are not very grammatical but might look like keywords in a keyword search.

Some sample Terrier code follows:
public block (DateTime start_date, DateTime end_date) DEPARTURE_SPEC( ){ interpret {[[I WANT ( )].LEAVE( )].range=DATE_TIME_RANGE( )} as

```
{
    if(range→start_datetime_spec.datetime.date_known
        ()){//may not be known if query was just "before the
        12th"
        DateAndTime
            start_date=range→start_datetime_spec.datetime;
    }
    if(range→end_datetime_spec.datetime.date_known
        ()){//may not be known if query was just "after the
        12th"
        DateAndTime
            end_date=range→end_datetime_spec.datetime;
    }
}
}
```

The square brackets mean that the I_WANT( ) block is optional; the entire I_WANT( ).LEAVE( ) is also optional. Assume that LEAVE( ) block covers expressions such as "leave", "leaving", "fly", "flying" and others.

The core of the answer is in the DATE_TIME_RANGE ( ) block defined below. Note that we use here only a relevant excerpt of the Terrier code, which is reproduced in FIG. 1. The more complete version of the Terrier code is in Appendix 1. It parses and interprets utterances like "this weekend," "from Friday until the Olympics," "for five days," and "during the next three hours."

```
public block (DateTimeRange range) DATE_TIM-
    E_RANGE( ){
    interpret {
        ("between".(n_start=DATE_AND_TIME( )))."and".
            (n_end=DATE_AND_TIME( ))) as { . . . }
    }
}
```

The core block definition used by the DATE_TIM-E_RANGE( ) block is DATE_AND_TIME( ), a block which aims at parsing and interpreting a specification of a date, with an optional phase of day (e.g. morning, evening) and an optional time.

Applying the block above, the input token "between" can be recognized by an incremental parser using the DATE_TIME_RANGE( ) block. In this parse, "between" is not optional and it must be followed by a pair of DATE_AND_TIME( ) blocks separated by "and". Hence, the parsing using this block is incomplete from "between" until the second DATE_AND_TIME( ) returns a value. After the second DATE_AND_TIME( ) block has returned, the parser state becomes interruptible: a pause longer than the low latency threshold Tmin during the interruptible state triggers the next action in forming a response, such as data searching, object creation, and turn-taking occurs.

In FIG. 1, when parsing the non-terminal at 111 begins, the parser is incomplete, in the sense that more input is required to complete the parse described by the DATE_TIME_RANGE( ) block. The word "between" 121 is the first token detected. When the parse forms a complete sentence specified by a non-terminal 131, the parser becomes interruptible, as further illustrated by FIG. 2.

FIG. 2 is a simplified state and transition diagram that includes an initial state 213, an incomplete state 215, an interruptible state 217, and a conversational agent turn taking state 219. Additional states would be included in a full state and transition diagram, including a fail state. The initial state 213 is the state the parser is in before any tokens are recognized. When parsing against the non-terminal 111 begins, the state of the parser is in the incomplete state 215.

During the parsing of a valid sentence, the parser proceeds to completion 131. Non-terminals can be nested. At some nesting levels, processing of the non-terminal completes a sentence and causes a state transition to the interruptible state 217. At other levels of nesting, the parser merely pops back up to the higher nesting level. In the interruptible state 217, a low latency threshold Tmin applies to detecting an interjection point. When a pause is detected that is longer than Tmin, an interjection point is detected. The state of the pause transitions to the conversational agent turn taking, which can include responding, launching a search, manipulating a data object, or another responsive action. In some implementations, the agent may start creating a speculative response before reaching completion, but no turn taking will occur until an interruptible state is reached and an interjection point is detected.

Speech recognition and natural language processing systems conventionally generate probability estimates, likelihood scores, or equivalent as parses proceed. In some implementations, the threshold Tmin is adjusted responsive to a score for a particular parse. The better the parse score is, the lower the Tmin can be set. For instance, a high likelihood parse could have a Tmin of 0.25 seconds or in a range of 0.2 to 0.3 seconds, while a medium likelihood parse could have a Tmin of 0.5 seconds, in a range of 0.45 to 0.55 seconds or longer. It is anticipated that these times will be adjusted with experience. This feature adjusts Tmin by taking into account the likelihood that the interruptible parse represents an actual intent of the utterance and requires shorter pause following a higher likelihood interruptible parse. Higher likelihood parses can produce lower latency turn taking.

One extension of detecting a first interjection point is successive qualification of an utterance. For instance, "Chinese restaurant in Santa Clara (pause) open after 10 pm". Or, "Call Kim Jones (pause) at home". In FIG. 2, more sound input can cause a transition from conversational agent turn taking 219 back to parsing in an incomplete state 215. In these examples, data can be assembled or manipulated while awaiting completion of the successive qualification. Upon transition from incomplete state 215 to interruptible state 217 and on to turn taking 219, the successive qualification can be applied as a filter, as a refined search, as further content to update data object, or the like.

Sometimes, the parser encounters a long pause before completion, resulting in a transition from incomplete state 215 to conversational agent turn taking state 219 without passing through the interruptible state 217. Alternatively, the parser could transition to a fail state, as mentioned above, but not illustrated in the figure. The conversational agent can undertake recovery from a parsing attempt that did not complete. This can happen, for instance, when the speaker changes their mind, is interrupted, or misspeaks and stops.

Sometimes, the parser encounters additional sound while in the interruptible state, resulting in a transition from interruptible state 217 back to incomplete state 215. This can result in rejection of a particular parse or it can be treated as a valid parse followed by successive qualification of the utterance.

While FIG. 2 is depicted in terms of states and state transitions that are readily implemented using a variety of state machines, the same logic can be implemented using control structures such as if-then-else statements, case statements, or any other programming language construct. The logic can be implemented by event generation and listeners that respond to events.

FIG. 3 is a simplified flow chart of a process that includes adjusting Tmin responsive to the likelihood that the interruptible parse represents the actual intent of the utterance.

Other implementations may perform the steps in different orders and/or perform different or additional steps than the ones illustrated in FIG. 3. For convenience, FIG. 3 will be described with reference to a system of one or more computers that perform the process. Actions 315, 325 involve a speech recognition and natural language processing system applying a conventional assignment of a probability estimate, likelihood score or equivalent. As described above, Tmin can be adjusted 335 responsive to the score assigned.

Action 343 or 347 is selected depending on progression of a parse. In some instances, the low latency threshold Tmin applies and a pause longer than Tmin 343 leads to the conversational agent taking a turn 353. On this leg of the flow, recovery or interpretation of a successive qualification of an utterance 363 sometimes follows turn taking 353. In some instances, the higher latency threshold Tmax applies and a pause longer than Tmax 347 leads to recovery 367 or another action by the conversational agent.

Figure 5:
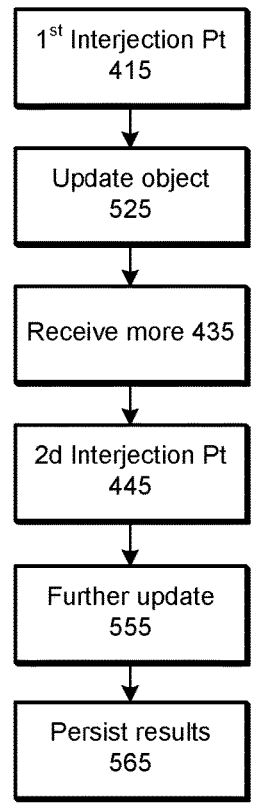

FIGS. 4-5 are simplified flows of processing successive qualification between first and second interjection points. Other implementations may perform the steps in different orders and/or perform different or additional steps than the ones illustrated. In one process, reaching a first interjection point 415 in a parse results in initiation of a search 425. In another process, reaching a first interjection point 415 in a parse results in creating, retrieving, or updating a data object 525. Yet other processes take other actions x25 triggered at the first interjection point 415. In these processes, further utterance is received 435 and a second interjection point reached 445. The further utterance, between the first and second interjection points, may be a relative clause that serves as a condition on the results for the initial utterance before the first interjection point. For example, in the utterance "I'm looking for a used BMW with no more than 100,000 miles" a first interjection point may be detected after "BMW." The initial utterance, "I'm looking for a used BMW," is a complete sentence. The further utterance, "with no more than 100,000 miles," may refine the search results of the first utterance by filtering based on the additional condition regarding mileage. In one process, reaching a second interjection point 445 in a parse results in filtering or refinement of a search 455. In some cases, results are forwarded 465. In another process, reaching a second interjection point 445 in a parse results in further updating or manipulation of a data object 555. A resulting data object can be persisted 565. Yet other processes take other actions x55, x65 triggered at the second interjection point 445.

Figure 7:
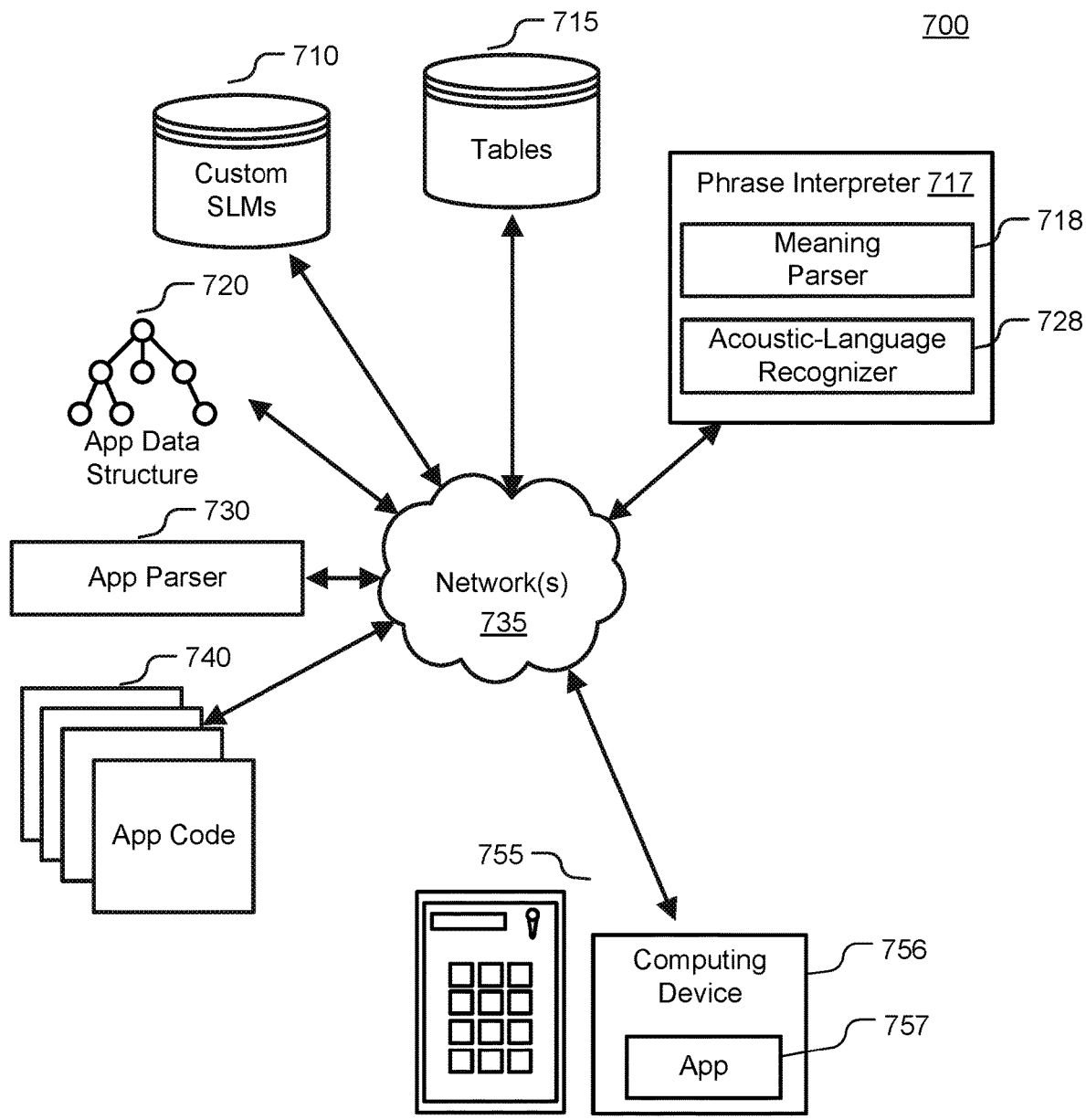
FIG. 7 is a high-level block diagram of a method and system that can be used to implement the technology disclosed.

FIG. 7 illustrates a block diagram of an example environment 700 in which the meaning parser and new programming constructs can be used for custom natural language understanding. The environment also includes a communications network 735 that allows for communication between various components of the environment. During operation, developers prepare and submit application code 740. Application code 740 can be stored for later processing or submitted directly to the application parser 730. The application code may reference custom statistical language models 710 (SLMs) and extended pattern tables 715. These SLMs and tables may be submitted with the application code 740 or may previously have been submitted by or made available to developers.

In one implementation, the network 735 includes the Internet. The network 735 also can utilize dedicated or private communication links that are not necessarily part of the Internet. In one implementation the network 735 uses standard communication technologies, protocols, and/or inter-process communication technologies.

Applications are used with the phrase interpreter engine 717 to understand spoken or text input. The client computing devices 755, the application parser engine 730 and the phrase interpreter engine 717 each include memory for storage of data and software applications, a processor for accessing data in executing applications, and components that facilitate communication over the network 735. The computing devices 755 execute applications, such as web browsers (e.g., a web browser application 757 executing on the computing device 756), to allow developers to prepare and submit application code 740 and allow users to submit phrases to be interpreted by the phrase interpreter engine 717. The computing devices 755, 756 may be for example a workstation, desktop computer, laptop, a tablet computer, mobile phone, or any other type of computing device.

The application parser engine 730 receives applications and parses them, producing a parse tree or an event stream. It produces application data structures 720 from the parsed application code 740. An application data structure 720 may represent a single application 740. Alternatively, multiple applications 740 may be used to prepare a single application data structure 720. The application data structure can, for instance, be a tree, a state machine, or a network of valid tokens. The application data structure can be compiled or in an interpretable structure. The application data structure 720 can include nodes that reference the custom SLMs 710 and the extended pattern tables 715. This data may be stored collectively or in copies on multiple computers and/or storage devices.

The acoustic-language recognizer 728 can be a conventional acoustic or speech recognition component that outputs tokens. It can operate in one or more stages. In this application, an acoustic-language recognizer or processor 728 can potentially only include a single stage, acoustic recognition-only processing without application of separate linguistic analysis. The technology disclosed can be applied to coupling preliminary processing to meaning-specific patterns, even when the tokens from preliminary processing are phonemes or other tokens that are not full words. For instance, an acoustic stage can process input sound samples to produce phonemes. These phonemes can be passed to a language or linguistic stage that considers and scores sequences of phonemes. Language recognizers sometimes use diphone or triphone analysis to recognize likely sequences of phonemes. Language recognizers sometimes use statistical language models to recognize statistically likely sequences of words.

Phrase interpreter engine 717 includes an acoustic-language recognizer 728 and the meaning parser 718. The phrase interpreter engine 717, like the application parser engine 730, is implemented using at least one hardware component. The engines are implemented in hardware, firmware, or software running on hardware. Software that is combined with hardware to carry out the actions of a phrase interpreter engine 717 can be stored on computer readable media such a rotating or non-rotating memory. The non-rotating memory can be volatile or non-volatile. In this application, computer readable media does not include a transitory electromagnetic signal that is not stored in a memory; computer readable media stores program instructions for execution.

Particular Implementations

Some implementations of the technology disclosed can be applied to solving particular problems. For instance, the problem of detecting interjection points for rapid turn taking can be solved by incrementally parsing input tokens derived from an input utterance against a grammar that specifies complete sentences with multiple parses executing in parallel. Start symbols can be Terrier blocks invoked by an incremental parser as responsive to evaluation of part of a received utterance. The incremental parser advances one token at a time. A parse state switches between an incomplete state and an interruptible state. The incomplete state has a higher latency threshold, abbreviated Tmax, and the interruptible state has a lower latency threshold, abbreviated Tmin. The incremental parser begins in the incomplete state and the parse state transitions from the incomplete state to the interruptible state when the incremental parser forms a complete sentence according to the grammar. The method further includes detecting coincidence of the interruptible state and a pause in the input utterance longer than the threshold Tmin to indicate a first interjection point. Incrementally parsing an input utterance creates and maintains multiple parses in parallel. The parses switch between an incomplete state and an interruptible state as start symbols are completed. Start symbols can be Terrier blocks invoked by an incremental parser as responsive to evaluation of part of a received utterance. The solution includes detecting in at least one of the parses coincidence of the interruptible state and a pause longer Tmin. The combination of the interruptible state and pause longer than Tmin indicates an interjection point.

This and other implementations of the technology disclosed can each optionally include one or more of the following features. This solution can be enhanced by taking into account the likelihood that a particular parse represents an actual intent of the utterance and using the likelihood to adjust the threshold Tmin. In some implementations, this involves setting a shorter threshold Tmin for a higher likelihood that the particular parse represents the actual intent.

Some implementations further include calculating a likelihood score that expresses a likelihood that a particular parse represents an actual intent of the utterance and comparing the duration of a pause against the threshold Tmin when the likelihood score exceeds a predetermined score threshold.

In some implementations, reaching the first interjection point causes initiation of a search, such as a search for restaurants, while incrementally parsing further input utterance. The further input utterance is parsed until detection of a second interjection point. Further qualification in the utterance of the search is used to refine the restaurant choices listed or other search results returned.

A first interjection point can cause initiation of a natural language web search while incrementally parsing further input utterance until detection of a second interjection point. Further qualification is used to refine interpretation of the natural language web search.

In some implementations, reaching the first interjection point causes initiation of data searching while incrementally parsing further input utterance until detection of a second interjection point. Further qualification is used to refine a result set upon detecting a second interjection point.

In some implementations, reaching the first interjection point causes creation of a data object, such as calendar entry, incrementally parsing further input utterance until detection of a second interjection point. The further input utterance is used to refine creating the calendar entry upon detecting a second interjection point.

Generally, reaching a first interjection point can result in creating, retrieving or updating a data object, and incrementally parsing further input until detection of a second interjection point. The further input is used to refine the data object creation, retrieval or updating upon detecting a second interjection point.

Other implementations may include a non-transitory computer readable storage medium storing instructions executable by a processor to perform a method as described above.

Figure 6:
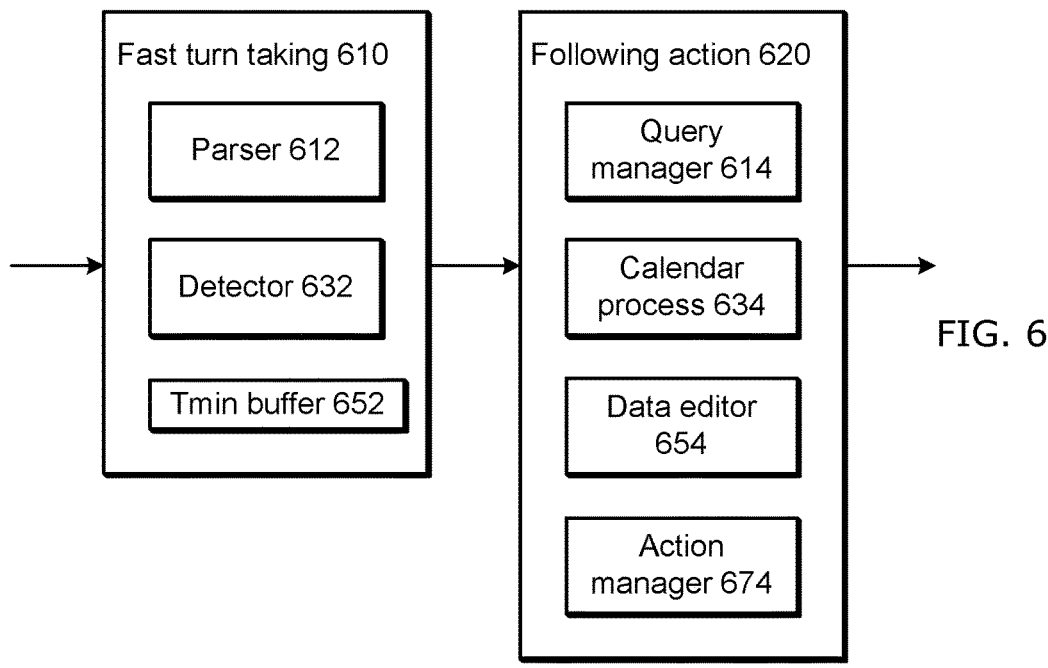
FIG. 6 is a block diagram of one implementation of quick turn taking interacting with software components that can be invoked by natural language commands.

Yet another implementation is a system including memory and one or more processors operable to execute instructions, stored in memory, to perform a method as described above. Block diagram FIG. 6 provides a high-level overview of the components involved in fast turn taking 610 and following actions 620. Implementations of a system can include computer implemented components that, when combined, are capable of carrying out the method. One component is an incremental parser 612. Another component is a detector 632 responsive to the parser that includes logic that detects coincidence of the interruptible state and a pause in the input utterance longer than the threshold Tmin as indicating a first or second interjection point. This logic can be implemented in hardware or in firmware or software interacting with hardware. The parser assigns a likelihood score to reaching a complete parse using conventional scoring techniques. Either the parser or the detector can adjust the threshold Tmin responsive to a likelihood score by resetting the threshold Tmin in a buffer 652, such as memory or a register. A variety of other components 620 can act responsive to the detection of the interjection point: a query manager 614, a calendar process 634, a data editor 654 or an action manager 674. A query manager interacts with a search engine, database or other search system. A calendar process updates a calendar. A data editor edits a data object. An action manager is a reasonable generalization of the query manager, calendar process and data editor; it is a framework for coupling the parser and detector to a further process of the developer's choice, for instance communicating through the further process' application program interface (API).

While certain technology is disclosed by reference to implementations detailed above, it is to be understood that the example implementations are intended in an illustrative rather than in a limiting sense. It is contemplated that modifications and combinations will readily occur to those skilled in the art, which modifications and combinations will be within the spirit of the invention and the scope of the following claims.

APPENDIX 1

A Fuller Version of The Terrier Block of DATE_TIME_RANGE( )

```
public block (DateAndTime start_time, DateAndTime end_time,
            int start_historical_day_index, int end_historical_day_index,
         int start_day_phase=ALL_DAY, int end_day_phase=ALL_DAY,
         bool start_time_mentioned=false,
         bool start_time_mentioned_first=false,
         bool start_date_inferred=false,
```

APPENDIX 1-continued

A Fuller Version of The Terrier Block of DATE_TIME_RANGE( )

```
            bool end_time_mentioned=false,
            bool end_time_mentioned_first=false,
            bool end_date_inferred=false,
                        SCHEDULED_EVENTS_TABLE_data start_scheduled_event_data,
SCHEDULED_EVENTS_TABLE_data end_scheduled_event_data)
DATE_TIME_RANGE( ) {
        shared : true
        open_source : false
        summary : "Returns a start and end DateAndTime, as well as historical_day_index-es
and scheduled_event_data as appropriate. Matches things like \"this weekend\", \"from friday
until the olympics\", \"for five days\", \"during the next three hours\""
        print {
                printf("StartTime: %04d-%02d-%02d", start_time.year( ), start_time.month( )+1,
start_time.day_of_month( )+1);
                if(start_time.time_known( )) {
                    printf("T%02d:%02d:%02d", start_time.hour( ), start_time.minute( ),
start_time.second( ));
                }
                printf(", ");
                printf("EndTime: %04d-%02d-%02d", end_time.year( ), end_time.month( )+1,
end_time.day_of_month( )+1);
                if(end_time.time_known( )) {
                    printf("T%02d:%02d:%02d", end_time.hour( ), end_time.minute( ),
end_time.second( ));
                }
        }
        external_test_file {
          [ now := "6 10 2013 2 3 4",
            file_name := "Tests/datetimerange_cases.se"]
        }
        interpret { [1/10 (n_noncumulative="in" | n_for="for" | 1/10 (("during the"| "over the"
| "for the" | "in the") . [1/50 ("entire" | 1/50 "whole")] . n_next="next")) ]
                        . ((n_count=INTEGER_COUNT( ) | (n_a_article=["a"] .
n_count_text=("few" | "several" | ("couple" | "couple of")))) .
(n_units_of_date=UNITS_OF_DATE( ) | n_units_of_time=UNITS_OF_TIME( )))
                        . n_include_now=["from" . ((([1/100 "right"] . "now") | "today")] //TODO
other start points?
              } as {
                    if(n_next && n_a_article) { excludethis( ); }
                        else if((n_noncumulative || n_for) && n_count_text && !n_a_article) {
excludethis( ); }
                    start_historical_day_index = INT_MIN;
                    end_historical_day_index = INT_MIN;
                    int increment_start_value = 0; //TODO different increments for date and
time
                    int duration = 1;
                    bool units_of_date_requested, units_of_time_requested = false;
                    UnitsOfDate increment_units_of_date = (UnitsOfDate) 0;
                    UnitsOfTime increment_units_of_time = (UnitsOfTime) 0;
                    if(n_units_of_date) {
                            increment_units_of_date = n_units_of_date->type;
                            units_of_date_requested = true;
                    }
                    if(n_units_of_time) {
                            increment_units_of_time = n_units_of_time->type;
                            units_of_time_requested = true;
                    }
                    if(n_next) {
                            increment_start_value = 1;
                    }
                    if(n_count) {
                            if(n_units_of_date && ((n_count->count == 1 && n_units_of_date-
>is_plural) || (n_count->count != 1 && !n_units_of_date-> is_plural))) { excludethis( ); }
                            else if(n_units_of_time && ((n_count->count == 1 &&
n_units_of_time->is_plural) || (n_count->count != 1 && !n_units_of_time-> is_plural))) {
excludethis( ); }
                            duration = (int) n_count->count;
                    }
                    else if(n_count_text) {
                            if(n_units_of_date && !n_units_of_date->is_plural) { excludethis( ); }
                            else if(n_units_of_time && !n_units_of_time-> is_plural) {
excludethis( ); }
                            if(strcmp(n_count_text->c_str( ), "couple") == 0 || strcmp(n_count_text-
>c_str( ), "couple of") == 0) {
                                    duration = 2;
                            }
```

APPENDIX 1-continued

A Fuller Version of The Terrier Block of DATE_TIME_RANGE( )

```
                        else if(strcmp(n_count_text->c_str( ), "few") == 0 ||
strcmp(n_count_text->c_str( ), "several") == 0) {
                            duration = 3;
                        }
                    }
                    start_time.set_date(now->year( ), now->month( ), now->day_of_month( ));
                    end_time.set_date(now->year( ), now->month( ), now-> day_of_month( ));
                    if((n_noncumulative || n_include_now) && !n_next) { //e.g. "in two
days"/"two days from now" is different from "for two days"/"next two days"
                        increment_start_value = duration;
                        duration = 1;
                    }
                    if(units_of_date_requested) {
                        increment_date(start_time, start_time, increment_start_value,
increment_units_of_date);
                        increment_date(end_time, start_time, (duration-1),
increment_units_of_date);
                        if(increment_start_value != 0) {
                            start_time.set_time(0,false,0,0);
                        }
                        end_time.set_time(23,false,59,59);
                    }
                    if(units_of_time_requested) {
                        start_time.set_time(now->hour( ), now-> am_pm_unknown( ), now-
>minute( ), now->second( ));
                        increment_date_time(start_time, start_time, increment_start_value,
increment_units_of_time);
                        increment_date_time(end_time, start_time, duration,
increment_units_of_time);
                    }
                }
                interpret {
                        (n_preposition2=[(1/50 "by") | "from" | (1/20 "for") | (1/20 "over")
| (1/20 "during") | (("starting" | "beginning") . [("on" | "with")]) | "on"] .
(n_start_date=DATE_AND_TIME( ) | n_start_multi_date=MULTI_DATE( ))
                            . [1/50 ["and"] . ((n_noninclusive=([1/100 "up"] . ("until" |
(1/100 "till"))) | n_preposition3=("through" | (1/100 "ending". [("on" | "with")]) | ("and" .
["on"]))) . (n_end_date=DATE_AND_TIME( ) | n_end_multi_date=MULTI_DATE( )))])
                        |
                        ("between" . (n_start_date=DATE_AND_TIME( ) |
n_start_multi_date=MULTI_DATE( )) . "and". (n_end_date=DATE_AND_TIME( ) |
n_end_multi_date=MULTI_DATE( )))
                        |
                        (((n_noninclusive=(([1/100 "up"] . ("until" | (1/100 "till")))) |
"through")) . (n_end_date=DATE_AND_TIME( ) | n_end_multi_date=MULTI_DATE( )))
                    } as {
                    start_historical_day_index = INT_MIN;
                    end_historical_day_index = INT_MIN;
                    if(n_start_date || n_start_multi_date) {
                        if(n_start_date) {
                            if(n_preposition2 && n_start_date-> starts_with_preposition) {
                                excludethis( );
                            }
                            if(!(n_start_date->datetime.date_known( ))) {
                                date_from_wday(start_time, *now, n_start_date-> wday_index,
n_start_date->week_delay);
                            }
                            else {
                                start_time.set_date(n_start_date->datetime);
                            }
                            start_historical_day_index = n_start_date-> historical_day_index;
                            start_day_phase = n_start_date->day_phase;
                            start_time_mentioned = n_start_date-> time_mentioned;
                            start_time_mentioned_first = n_start_date-> time_mentioned_first;
                            if(n_start_date->datetime.time_known( )) {
                                start_time.set_time(n_start_date->datetime.hour( ), n_start_date-
>datetime.am_pm_unknown( ), n_start_date->datetime.minute( ), 0);
                            }
                            else if(!n_start_date->today_requested && n_start_date-
>day_phase==ALL_DAY) {
                                start_time.set_time(0,false,0,0);
                            }
                        }
                        else if(n_start_multi_date) {
                            if(n_start_multi_date->has_the && !(n_preposition2 ||
n_preposition3)) { excludethis( ); }
                            start_time.set_date(n_start_multi_date->start_time);
                            if(!(n_start_multi_date->start_time.time_known( ))) {
```

APPENDIX 1-continued

A Fuller Version of The Terrier Block of DATE_TIME_RANGE( )

```
                                start_time.set_time(0,false,0,0);
                        }
                        start_historical_day_index = n_start_multi_date->
historical_day_index;
                        start_scheduled_event_data = n_start_multi_date->
scheduled_event_data;
                        end_time.set_date(n_start_multi_date->end_time);
                        end_time.set_time(23,false,59,59);
                        end_historical_day_index = n_start_multi_date->
historical_day_index; //TODO -- set these or not?
                        end_scheduled_event_data = n_start_multi_date->
scheduled_event_data;
                }
                if(n_end_date || n_end_multi_date) {
                        if(n_end_date) {
                                if(n_end_date->starts_with_preposition) {
                                        excludethis( );
                                }
                                if(!(n_end_date->datetime.date_known( ))) {
                                    date_from_wday(end_time, start_time, n_end_date-
>wday_index, n_end_date->week_delay);
                                }
                                else {
                                        end_time.set_date(n_end_date->datetime);
                                }
                                end_historical_day_index = n_end_date->
historical_day_index;
                                end_day_phase = n_end_date->day_phase;
                                end_time_mentioned = n_end_date-> time_mentioned;
                                end_time_mentioned_first = n_end_date->
time_mentioned_first;
                                if(n_end_date->datetime.time_known( )) {
                                    end_time.set_time(n_end_date-> datetime.hour( ),
n_end_date->datetime.am_pm_unknown( ), n_end_date-> datetime.minute( ), 59);
                                }
                                else {
                                    if(n_noninclusive) {
                                            end_time.set_time(0,false,0,0);
                                            increment_date_time(end_time, end_time, -1,
SECONDS);
                                    }
                                    else {
                                            end_time.set_time(23,false,59,59);
                                    }
                                }
                        }
                        else if(n_end_multi_date) {
                                if(n_end_multi_date->has_the && !(n_preposition2 ||
n_preposition3)) { excludethis( ); }
                                if(n_noninclusive) {
                                    end_time.set_date(n_end_multi_date-> start_time); // "until"
means stop at the beginning of the event/holiday
                                }
                                else{
                                    end_time.set_date(n_end_multi_date-> end_time);
                                }
                                if(!(n_end_multi_date-> end_time.time_known( ))) {
                                        if(n_noninclusive) {
                                                end_time.set_time(0,false,0,0);
                                        }
                                        else{
                                                end_time.set_time(23,false,59,59);
                                        }
                                }
                                end_historical_day_index = n_end_multi_date->
historical_day_index;
                                end_scheduled_event_data = n_end_multi_date ->
scheduled_event_data;
                        }
                }
                else if(!end_time.date_known( )) { //Need to check because it may have
been already set by n_start_multi_date (e.g. a multi-day holiday)
                        end_date_inferred = true;
                        end_time.set_date(start_time);
                        if(n_noninclusive) {
                                end_time.set_time(0,false,0,0);
                                increment_date_time(end_time, end_time, -1, SECONDS);
                        }
```

APPENDIX 1-continued

A Fuller Version of The Terrier Block of DATE_TIME_RANGE( )

```
                    else if(start_day_phase == ALL_DAY) {
                        end_time.set_time(23,false,59,59);
                    }
                }
            }
        }
        else if (n_end_date || n_end_multi_date) {
            start_date_inferred = true;
            if(n_end_date) {
                start_time.set_date(*now);
                if(!n_end_date->datetime.date_known( )) {
                    date_from_wday(end_time, start_time, n_end_date -> wday_index,
n_end_date->week_delay);
                }
                else {
                    end_time.set_date(n_end_date->datetime);
                }
                end_time_mentioned = n_end_date->time_mentioned;
                end_time_mentioned_first = n_end_date-> time_mentioned_first;
                if(n_end_date->datetime.time_known( )) {
                    end_time.set_time(n_end_date->datetime.hour( ), n_end_date-
>datetime.am_pm_unknown( ), n_end_date->datetime.minute( ), 0);
                }
                else {
                    if(n_noninclusive) {
                        end_time.set_time(0,false,0,0);
                        increment_date_time(end_time, end_time, -1, SECONDS);
                    }
                    else {
                        end_time.set_time(23,false,59,59);
                    }
                }
                end_historical_day_index = n_end_date-> historical_day_index;
            end_day_phase = n_end_date->day_phase;
            }
            else if(n_end_multi_date) {
                if(n_end_multi_date->has_the && !(n_preposition2 || n_preposition3))
{ excludethis( ); }
                end_time.set_date(n_end_multi_date->end_time); //TODO through vs
until
                end_historical_day_index = n_end_multi_date-> historical_day_index;
                end_scheduled_event_data = n_end_multi_date->
scheduled_event_data;
            }
        }
    }
}
```

The invention claimed is:

1. A system including:
at least one processor, memory coupled to the processor, and computer instructions in the memory that include:
a parser that incrementally parses input tokens derived from an input utterance against a grammar that specifies complete sentences, with multiple parses operating in parallel;
wherein a parser state switches between an incomplete state and an interruptible state;
wherein the incomplete state has a higher latency threshold, abbreviated Tmax, than the interruptible state's lower latency threshold, abbreviated Tmin; and
wherein the parse begins in the incomplete state and transitions from the incomplete state to the interruptible state when the incremental parsing of the input tokens forms a complete sentence according to at least one parse for the grammar; and
a detector responsive to the parser that detects coincidence of the interruptible state and a pause in the input utterance longer than the threshold Tmin to indicate a first interjection point.

2. The system of claim 1, wherein the detector or the parser adjusts the threshold Tmin responsive to a likelihood score that expresses the likelihood that a particular parse has formed a complete sentence represents an actual intent of the utterance, wherein the threshold Tmin is lower for a higher likelihood that the particular parse represents the actual intent.

3. The system of claim 1, wherein the parser calculates a likelihood score that expresses a likelihood that a particular parse represents an actual intent of the utterance and applying the threshold Tmin when the likelihood score exceeds a predetermined score threshold.

4. The system of claim 1, further including:
a query manager that initiates a data search after the first interjection point responsive to a first meaning returned from the incremental parsing of the input utterance;
the parser incrementally parsing a further input utterance;
the detector further detecting a second interjection point; and
the query manager further modifying a return of results from the data search after the second interjection point based on a second meaning parsed from the further utterance.

5. The system of claim 1, further including:
a data editor initiating manipulation of a data object after the first interjection point responsive to a first meaning returned from the incremental parsing of the input utterance;
the parser incrementally parsing a further input utterance;
the detector detecting a second interjection point; and
the data editor further manipulating the data object after the second interjection point based on a second meaning of a further complete sentence parsed from the further utterance.

6. The system of claim 1, further including:
an action manager that initiates a first action after the first interjection point responsive to a first meaning represented by a particular complete sentence;
the parser incrementally parsing a further input utterance;
the detector further detecting a second interjection point; and
the action manager further modifying the first action after the second interjection point based on a second meaning parsed from the further utterance.

7. A method of incrementally parsing input tokens from an utterance with multiple parses performed in parallel, the method comprising:
determining a likelihood score, which indicates a likelihood that at least one parallel parse represents an actual intent of the utterance according to a grammar;
responsive to the likelihood score being below a score threshold, determining a first interjection point by detecting that the duration of a pause in the input utterance exceeds a first pause threshold; and
responsive to the likelihood score being above the score threshold, determining a first interjection point by detecting that the duration of a pause in the input utterance exceeds a second pause threshold, wherein the second pause threshold is lower than the first pause threshold.

8. The method of claim 7, further including initiating a first action after the first interjection point responsive to the at least one parallel parse.

9. The method of claim 7, further comprising:
adjusting the second pause threshold based on the likelihood score, wherein the second pause threshold is adjusted lower for a higher likelihood score.

10. The method of claim 7, further including using the first interjection point to initiate searching for entities based on meaning of the at least one parallel parse while incrementally parsing a further input utterance until detection of a second interjection point, and using the parsed further input to refine a list of entity choices returned by the searching.

11. The method of claim 10, wherein an entity in the list of entity choices is one of:
a service;
a restaurant;
a product;
an automobile; and
a response to an informational request.

12. The method of claim 7, further including using the first interjection point to initiate a natural language web search based on meaning of the at least one parallel parse while incrementally parsing a further input utterance until detection of a second interjection point, and using the parsed further input to refine interpretation of the natural language web search.

13. A method including:
incrementally parsing input tokens derived from an input utterance against a grammar that specifies complete sentences, with multiple parses operating in parallel;
wherein a parsing state switches between an incomplete state and an interruptible state;
wherein the incomplete state has a higher latency threshold, abbreviated Tmax, than the interruptible state's lower latency threshold, abbreviated Tmin; and
wherein the parsing begins in the incomplete state and transitions from the incomplete state to the interruptible state when the incremental parsing of the input tokens forms a complete sentence according to at least one parse for the grammar; and
responsive to the parsing, detecting coincidence of the interruptible state and a pause in the input utterance longer than the threshold Tmin to indicate a first interjection point.

14. The method of claim 13, wherein the detecting or the parsing adjusts the threshold Tmin responsive to a likelihood score that expresses the likelihood that a particular parse has formed a complete sentence represents an actual intent of the utterance, wherein the threshold Tmin is lower for a higher likelihood that the particular parse represents the actual intent.

15. The method of claim 13, wherein the parsing calculates a likelihood score that expresses a likelihood that a particular parse represents an actual intent of the utterance and applies the threshold Tmin when the likelihood score exceeds a predetermined score threshold.

16. The method of claim 13, further including:
initiating a data search after the first interjection point responsive to a first meaning returned from the incremental parsing of the input utterance;
incrementally parsing a further input utterance;
detecting a second interjection point; and
modifying a return of results from the data search after the second interjection point based on a second meaning parsed from the further utterance.

17. The method of claim 13, further including:
initiating manipulation of a data object after the first interjection point responsive to a first meaning returned from the incremental parsing of the input utterance;
incrementally parsing a further input utterance;
detecting a second interjection point; and
manipulating the data object after the second interjection point based on a second meaning of a further complete sentence parsed from the further utterance.

18. The method of claim 13, further including:
initiating a first action after the first interjection point responsive to a first meaning represented by a particular complete sentence;
incrementally parsing a further input utterance;
detecting a second interjection point; and
modifying the first action after the second interjection point based on a second meaning parsed from the further utterance.

19. A non-transitory computer-readable recording medium having computer instructions recorded thereon, the computer instructions, when executed on one or more processors, causing the one or more processors to implement operations comprising:
incrementally parsing input tokens derived from an input utterance against a grammar that specifies complete sentences, with multiple parses operating in parallel;
wherein a parsing state switches between an incomplete state and an interruptible state;

wherein the incomplete state has a higher latency threshold, abbreviated Tmax, than the interruptible state's lower latency threshold, abbreviated Tmin; and wherein the parsing begins in the incomplete state and transitions from the incomplete state to the interruptible state when the incremental parsing of the input tokens forms a complete sentence according to at least one parse for the grammar; and responsive to the parsing, detecting coincidence of the interruptible state and a pause in the input utterance longer than the threshold Tmin to indicate a first interjection point.

20. The non-transitory computer-readable recording medium of claim 19, wherein the detecting or the parsing adjusts the threshold Tmin responsive to a likelihood score that expresses the likelihood that a particular parse has formed a complete sentence represents an actual intent of the utterance, wherein the threshold Tmin is lower for a higher likelihood that the particular parse represents the actual intent.

21. The non-transitory computer-readable recording medium of claim 19, wherein the parsing calculates a likelihood score that expresses a likelihood that a particular parse represents an actual intent of the utterance and applies the threshold Tmin when the likelihood score exceeds a predetermined score threshold.

22. The non-transitory computer-readable recording medium of claim 19, wherein the operations further include:
  initiating a data search after the first interjection point responsive to a first meaning returned from the incremental parsing of the input utterance;
  incrementally parsing a further input utterance;
  detecting a second interjection point; and
  modifying a return of results from the data search after the second interjection point based on a second meaning parsed from the further utterance.

23. The non-transitory computer-readable recording medium of claim 19, wherein the operations further include:
  initiating manipulation of a data object after the first interjection point responsive to a first meaning returned from the incremental parsing of the input utterance;
  incrementally parsing a further input utterance;
  detecting a second interjection point; and
  manipulating the data object after the second interjection point based on a second meaning of a further complete sentence parsed from the further utterance.

24. The non-transitory computer-readable recording medium of claim 19, wherein the operations further include:
  initiating a first action after the first interjection point responsive to a first meaning represented by a particular complete sentence;
  incrementally parsing a further input utterance;
  detecting a second interjection point; and
  modifying the first action after the second interjection point based on a second meaning parsed from the further utterance.

25. A non-transitory computer-readable recording medium having computer instructions recorded thereon for incrementally parsing input tokens from an utterance with multiple parses performed in parallel, the computer instructions, when executed on one or more processors, causing the one or more processors to implement operations comprising:
  determining a likelihood score, which indicates a likelihood that at least one parallel parse represents an actual intent of the utterance according to a grammar;
  responsive to the likelihood score being below a score threshold, determining a first interjection point by detecting that the duration of a pause in the input utterance exceeds a first pause threshold; and
  responsive to the likelihood score being above the score threshold, determining a first interjection point by detecting that the duration of a pause in the input utterance exceeds a second pause threshold, wherein the second pause threshold is lower than the first pause threshold.

26. The non-transitory computer-readable recording medium of claim 25, wherein the operations further include initiating a first action after the first interjection point responsive to the at least one parallel parse.

27. The non-transitory computer-readable recording medium of claim 25, wherein the operations further include adjusting the second pause threshold based on the likelihood score, wherein the second pause threshold is adjusted lower for a higher likelihood score.

28. The non-transitory computer-readable recording medium of claim 25, wherein the operations further include using the first interjection point to initiate searching for entities based on meaning of the at least one parallel parse while incrementally parsing a further input utterance until detection of a second interjection point, and using the parsed further input to refine a list of entity choices returned by the searching.

29. The non-transitory computer-readable recording medium of claim 28, wherein an entity in the list of entity choices is one of:
  a service;
  a restaurant;
  a product;
  an automobile; and
  a response to an informational request.

30. The non-transitory computer-readable recording medium of claim 25, wherein the operations further include using the first interjection point to initiate a natural language web search based on meaning of the at least one parallel parse while incrementally parsing a further input utterance until detection of a second interjection point, and using the parsed further input to refine interpretation of the natural language web search.

31. A system including one or more processors coupled to memory, the memory loaded with computer instructions for incrementally parsing input tokens from an utterance with multiple parses performed in parallel, the computer instructions, when executed on the one or more processors, causing the one or more processors to implement operations comprising:
  determining a likelihood score, which indicates a likelihood that at least one parallel parse represents an actual intent of the utterance according to a grammar;
  responsive to the likelihood score being below a score threshold, determining a first interjection point by detecting that the duration of a pause in the input utterance exceeds a first pause threshold; and
  responsive to the likelihood score being above the score threshold, determining a first interjection point by detecting that the duration of a pause in the input utterance exceeds a second pause threshold, wherein the second pause threshold is lower than the first pause threshold.

32. The system of claim 31, wherein the operations further include initiating a first action after the first interjection point responsive to the at least one parallel parse.

33. The system of claim 31, wherein the operations further include adjusting the second pause threshold based on the likelihood score, wherein the second pause threshold is adjusted lower for a higher likelihood score.

34. The system of claim 31, wherein the operations further include using the first interjection point to initiate searching for entities based on meaning of the at least one parallel parse while incrementally parsing a further input utterance until detection of a second interjection point, and using the parsed further input to refine a list of entity choices returned by the searching.

35. The system of claim 34, wherein an entity in the list of entity choices is one of:
- a service;
- a restaurant;
- a product;
- an automobile; and
- a response to an informational request.

36. The system of claim 31, wherein the operations further include using the first interjection point to initiate a natural language web search based on meaning of the at least one parallel parse while incrementally parsing a further input utterance until detection of a second interjection point, and using the parsed further input to refine interpretation of the natural language web search.

* * * * *